(12) United States Patent  
Ramos

(10) Patent No.: US 8,992,289 B2
(45) Date of Patent: Mar. 31, 2015

(54) KNIFE WITH HOOK FOR SKINNING AND METHODS OF USING THE SAME

(71) Applicant: Ruben Madrid Ramos, Jal, NM (US)

(72) Inventor: Ruben Madrid Ramos, Jal, NM (US)

(*) Notice: Subject to any disclaimer, the term of this patent is extended or adjusted under 35 U.S.C. 154(b) by 0 days.

(21) Appl. No.: 13/866,808

(22) Filed: Apr. 19, 2013

(65) Prior Publication Data

US 2013/0280997 A1 Oct. 24, 2013

Related U.S. Application Data

(60) Provisional application No. 61/635,671, filed on Apr. 19, 2012.

(51) Int. Cl.
*B26B 9/00* (2006.01)
*B26B 3/00* (2006.01)
*B26B 9/02* (2006.01)

(52) U.S. Cl.
CPC ... *B26B 3/00* (2013.01); *B26B 9/02* (2013.01); *B26B 9/00* (2013.01)
USPC ........................................................ 452/132

(58) Field of Classification Search
CPC ............ B26B 3/06; B26B 1/042; B26B 1/10; B26B 5/00; B26B 9/02; B26B 11/006; B26B 1/00; B26B 29/02; A22B 5/168; A22B 5/0047; B25G 1/04; B25G 1/02
USPC ........... 30/314, 353, 357, 317, 315, 356, 155; 452/102–105, 132, 125
See application file for complete search history.

(56) References Cited

U.S. PATENT DOCUMENTS

| | | | |
|---|---|---|---|
| 2,906,021 A * | 9/1959 | Cromoga | 30/293 |
| D257,056 S * | 9/1980 | Spivey | D22/118 |
| 4,283,854 A * | 8/1981 | Austin | 30/314 |
| 4,707,920 A * | 11/1987 | Montgomery | 30/294 |
| D330,405 S * | 10/1992 | Luchak | D22/118 |
| 5,386,635 A * | 2/1995 | Sheba | 30/294 |
| 5,485,677 A * | 1/1996 | Seber | 30/294 |
| 5,490,332 A * | 2/1996 | Levin | 30/161 |
| D398,211 S * | 9/1998 | Howard | D8/98 |
| 6,105,262 A * | 8/2000 | Rickard | 30/349 |
| D448,697 S * | 10/2001 | Akagi | D10/132 |
| 6,574,868 B1 * | 6/2003 | Overholt | 30/155 |
| D486,202 S * | 2/2004 | Rae et al. | D22/118 |
| 7,214,127 B1 * | 5/2007 | Thompson et al. | 452/103 |
| 7,578,731 B1 * | 8/2009 | Moore | 452/103 |
| 8,021,216 B1 * | 9/2011 | Moore | 452/103 |
| 8,475,241 B1 * | 7/2013 | Moore | 452/103 |
| 8,495,777 B1 * | 7/2013 | Dixon | 7/144 |
| 2008/0178474 A1 | 7/2008 | Spencer et al. | |

* cited by examiner

*Primary Examiner* — Richard Price, Jr.
(74) *Attorney, Agent, or Firm* — Triangle Patents, PLLC

(57) ABSTRACT

A knife having a hook incorporated into the blade for skinning, wherein the hook is a belly hook that is positioned on the belly side or under side of the knife opposite a finger guard area. Methods of the using the knife include steps for using the cutting edge to cut and using the hook to cut by pressure applied away from the user's body.

15 Claims, 4 Drawing Sheets

KNIFE WITH HOOK FOR SKINNING AND METHODS OF USING THE SAME

CROSS REFERENCE TO RELATED INVENTIONS

This application claims the benefit of U.S. Provisional Application No. 61/635,671, filed Apr. 19, 2012, which is incorporated herein by reference in its entirety.

BACKGROUND OF THE INVENTION

1. Field of the Invention

The present invention relates to a knife incorporating a hook for skinning and methods of using the same.

2. Description of the Prior Art

It is known in the prior art to provide a knife with additional functions to the basic cutting blade. For example, it is known to include a hook on the spine side of a knife, the hook used in operation by pulling the knife and hook toward the body of the user. This motion towards the body of the user can result in injury. Notably, prior art knife blades do not provide a skinning hook blade positioned opposite the spine.

SUMMARY OF THE INVENTION

The present invention relates to a dual-purpose knife for cutting and for skinning.

It is an object of this invention to provide a knife with a hook constructed and positioned and configured on the portion of knife blade located near the handle, opposite of the knife spine.

Yet another object of this invention is to provide a method for using a knife belly cutting edge for cutting and a belly hook for skinning, wherein activation of the cutting edge is provided by applying downward pressure from a handle and spine side of the knife, and wherein activation of the belly hook for skinning is provided by applying a forward movement of the knife, through pressure applied on the handle and optionally the finger guard area, moving the knife away from the user's body, thereby reducing risk.

These and other aspects of the present invention will become apparent to those skilled in the art after a reading of the following description of the preferred embodiment when considered with the drawings, as they support the claimed invention.

DETAILED DESCRIPTION

Figure 1:
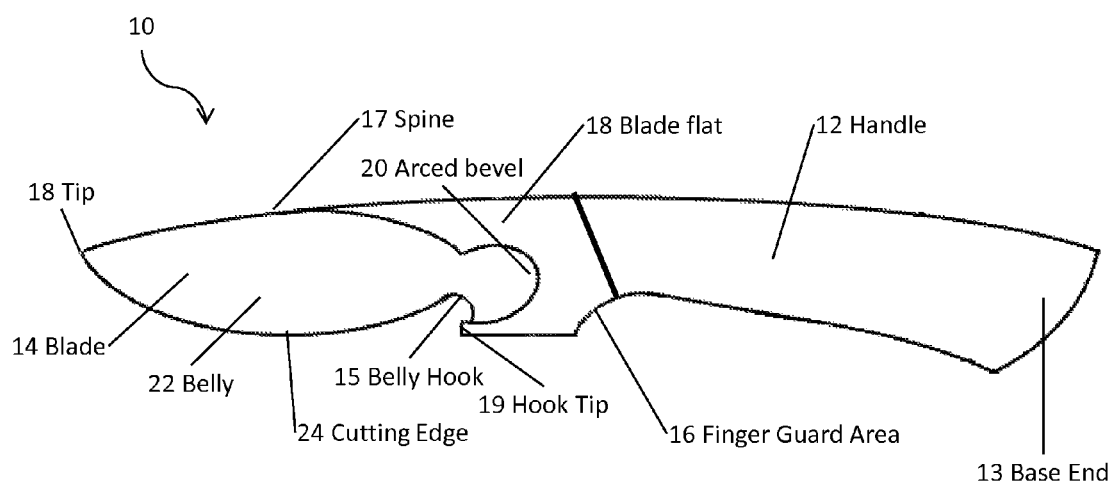
FIG. 1 is a side view of one embodiment of the invention having a finger guard area on the blade side of the knife, and the handle shaped accordingly.

Referring now to the drawings in general, the illustrations are for the purpose of describing preferred embodiments of the invention and are not intended to limit the invention thereto.

The present invention provides a knife having a hook incorporated with it for skinning. In preferred embodiments of the present invention, the hook is a belly hook that is positioned on the belly, blade, or under side of the knife and incorporated into the blade itself.

The knife blade and hook are constructed and configured with the cutting edge of the knife blade opposite the knife spine, and the hook being at the base of the knife blade nearest the handle and on the same side as the cutting edge, and spaced apart from a finger guard area of the handle. Preferably, the belly hook is unitary and integrally formed as part of the cutting edge of the blade, i.e., with a cutting hook concave area and tip that are part of the continuous cutting edge of the blade, but the cutting hook concavity presents a cutting edge surface hook that faces in a direction away from the base end of the knife handle and toward the knife blade tip, which is in a direction different from the convex arc of the cutting blade belly, as illustrated in the figures.

By contrast to prior art knife blades that may include a hook on the spine side of a knife that is used by pulling the knife and hook toward the body of the user, the present invention provides a cutting edge hook that is used by pushing the knife away from the user of the body, which is much safer than prior art knives. Also, notably, positioning the hook on the spine of the knife weakens the blade and makes the blade prone to breaking. Furthermore, the prior art hooks are typically positioned near the knife blade tip on the spine, which weakens the knife blade and compromises the integrity and strength of the knife.

Additionally, a prior art knife having a hook on a spine not having a cutting edge limits the effectiveness of the knife while skinning. Because the present invention incorporates a belly hook onto the same side as the knife blade, adjacent to the handle, the user may simultaneously and continuously cut and skin while using the knife, without the need to pull up and out of the hide as required by prior art blades.

The present invention also provides a method for using a knife belly cutting edge for cutting and a belly hook for skinning, wherein activation of the cutting edge is provided by applying downward pressure from a handle and spine side of the knife, and wherein activation of the belly hook for skinning is provided by applying a forward movement of the knife, through pressure applied on the handle and optionally the finger guard area, moving the knife away from the user's body. In methods of using the present invention, for example when skinning an animal, the knife is usable in at least two ways: one is cutting by applying pressure downwardly from the spine with the cutting edge and tip of the knife; another is cutting and skinning by applying pressure forwardly away from the user's body, preferably with the spine facing toward the user, making an incision in the hide, inserting the knife belly hook and pushing away from the user's body. The user can alternatively turn the cutting edge up towards the user and insert the tip of the knife and push away from the user's body. The belly hook is part of the cutting edge surface but faces a different direction than the arc of the main blade cutting edge or belly, as illustrated in the figures.

As presented in the figures, the knife with a hook or belly hook is illustrated in several embodiments. FIGS. 1-4 illustrate side views of various embodiments of the belly hook knife of the present invention, generally described as 10. FIG. 1 illustrates a continuous handle 12 having a base end 13 opposite the knife tip 18, the opposite end of the handle being adjacent to the blade flat 18 and a concave finger guard area 16. The finger guard area 16 is constructed and configured for receiving applied pressure by human fingers and for protecting or shielding the fingers from the cutting edge 24 and belly hook 15 of the knife's blade 14. The belly hook is a concave extension of the blade cutting edge 24, wherein the concavity is open or directed away from the handle 12, and downwardly opens in the same direction as the belly 22 of the knife blade 14. The cutting edge of the knife blade is illustrated as an arc surface exposing the blade cutting edge away from the spine 17 of the knife. The knife further includes a tip 18 that points in substantially the same direction as a hook tip 19 of the belly hook. The hook tip projects forward to establish a receiving cavity that is formed with the concave part of the cutting edge, thereby providing a concave hook cutting surface that is downwardly facing away from the spine and forward facing away from the base end of the handle. The belly hook preferably includes a concave area and a hook tip that form a U-shape on the cutting edge of the blade. The base end of the handle is illustrated as having an angled end with a substantially flat end that faces downwardly in the same direction as the concave finger guard area, although other embodiments would be apparent to one skilled in the art. FIGS. 1-4 all show an arced bevel 20 that approximates the shape of the concave belly hook cutting edge.

In one embodiment of the present invention, the blade of the knife extends from the spine to the cutting edge, the spine being a thickness greater than the cutting edge, resulting in either a slight angle across the surface of the blade from the spine to the cutting edge or a planar concave extending between the two points. Further, in embodiments of the present invention, the cutting edge itself may be the result of two planar concave surfaces of opposite sides of the blade, two slight angles resulting in a wedge, or a wedge further angled on the cutting edge itself to give it a chiseled shape. Further embodiments of the blade surface and the cutting edge would be apparent to one skilled in the art.

In another embodiment of the present invention, the cutting edge and surface of the blade extends from the tip through the belly hook, so that the belly hook itself may contain the configurations of the blade and cutting edge noted above. Specifically, the belly hook may include a planar concave, wedge, or chisel shaped cutting edge as the result of the plane between the belly hook's cutting edge and the blade flat.

Figure 2:
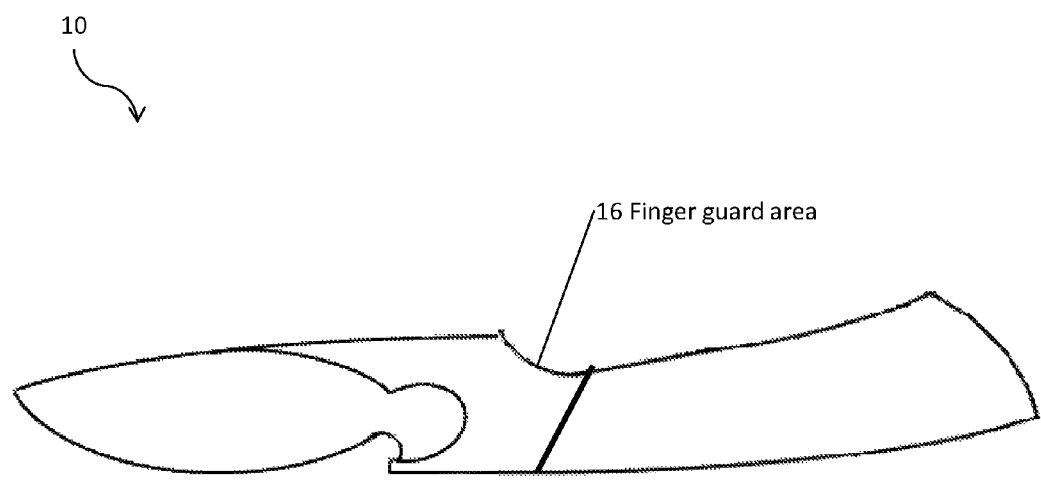
FIG. 2 is a side view of another embodiment of the invention having the finger guard area located on the spine side of the knife, and the handle shaped accordingly.

FIG. 2 illustrates another embodiment of the present invention wherein the knife is constructed and configured with the finger guard area 16 on the top side or spine side of the knife, spaced apart and opposite the belly hook on the bottom cutting edge side of the knife blade, and providing a concave finger guard area that is suitable for receiving applied pressure thereon for using the knife. The base end of the handle is illustrated as having an angled end with a substantially flat end that faces upwardly away from the belly hook and upwardly in the same direction as the concave finger guard area.

Figure 3:
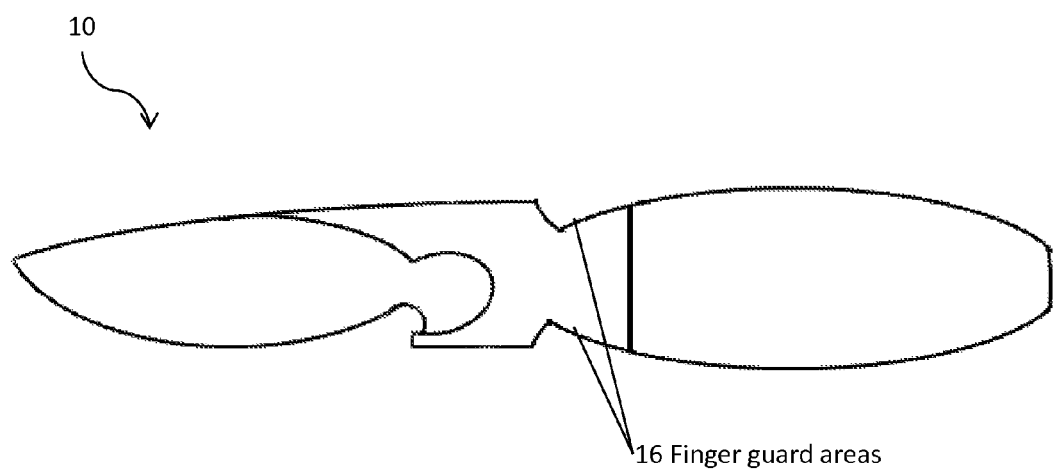
FIG. 3 is a side view of another embodiment of the invention having a figure guard area on both the blade and spine side of the knife, and the handle shaped accordingly.

FIG. 3 illustrates another embodiment of the present invention wherein the knife is constructed and configured with two finger guard areas, a first finger guard area positioned on the top side or spine side of the knife, spaced apart and opposite the belly hook on the bottom cutting edge side of the knife blade, and a second finger guard area positioned on the bottom side that is opposite the spine side of the knife, and spaced apart from the belly hook on the bottom cutting edge side of the knife blade (also illustrated in FIG. 1), wherein both of the finger guard areas are configured for providing a concave finger guard area that is suitable for receiving applied pressure thereon for using the knife. The base end of the handle is illustrated as curved or rounded in FIG. 3.

Figure 4:
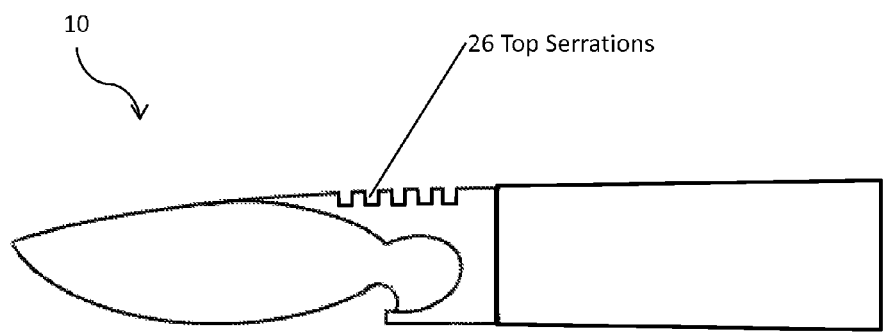
FIG. 4 is a side view of another embodiment of the invention having no finger guard, with the handle shaped accordingly, and top serrations.

FIG. 4 illustrates another embodiment of the present invention, wherein the knife again includes a blade belly side hook, but no finger guards adjacent to the handle. Furthermore, the handle is substantially flat. Additionally, opposite the belly hook and positioned on the handle-side of the spine are serrations 26, which grant the knife the additional functions of cutting through thin metal and wood, scaling fish, or using the serrations as a sturdy prying mechanism, amongst other uses.

The knife blade is illustrated to be approximately equal in length to the handle of the knife in the figures of this description. The blade may be longer or shorter than the handle of the knife in other embodiments and is not intended to be limited by the embodiments illustrated herein. Similarly, the handle may be longer or shorter, or have other general gripping surface shapes beyond those illustrated.

The blade is formed of metal, by way of example and not limitation, formed of steel. The handle may be formed of wood, plastic, metal, composite material, or any suitable material having qualities desired in a grip and for use of the knife cutting edge and belly hook of the present invention. The handle may be unitary and integrated seamlessly with the knife blade or attached onto the knife blade away from the cutting edge and belly hook.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A knife comprising:
   a knife blade having a cutting edge and a spine edge that are opposite and spaced apart;
   the knife blade further including a belly hook that is constructed and configured at the base of the knife blade away from a tip of the blade and near a handle and on the same side as the cutting edge;
   a blade flat including a hook tip adjacent to the belly hook and two finger guards, the finger guards being concave and positioned adjacent to the handle and symmetrical to each other.

2. The knife of claim 1, wherein the belly hook includes a concave area that forms a U-shape on the cutting edge of the blade.

3. The knife of claim 1, wherein the belly hook is incorporated with the blade.

4. The knife of claim 1, wherein the belly hook is unitary and integrally formed as part of the blade.

5. The knife of claim 1, wherein the belly hook is unitary and integrally formed as part of the cutting edge of the blade.

6. A method for using a knife comprising the steps of:
   providing a knife having a knife blade with a belly cutting edge for cutting and a belly hook for skinning, the knife further having a blade flat including finger guard areas being concave and positioned adjacent to the handle and symmetrical to each other;
   activating the tip and the cutting edge by applying downward pressure from a handle and the finger guard on the belly side of the knife; and
   cutting with the belly hook by applying a forward movement of the knife, through pressure applied on the handle and the finger guard area positioned on the belly side of the knife;
   moving the knife away from the user's body, a hook tip without an edge catching a skin, thereby ensuring the skin remains positioned within the belly hook.

7. A knife comprising:

a handle;

a blade having at least one finger guard on a flat, an edge, a belly, a tip, a spine, a belly hook, and a hook tip;

wherein the handle is positioned adjacent to the flat and opposite the tip;

wherein the belly hook is positioned adjacent to the flat, spaced apart from the handle, adjacent to belly, and opposite the spine;

wherein the hook tip and is positioned adjacent to the belly hook on the flat;

wherein the belly extends from the belly hook to the tip and is positioned opposite the spine;

a cutting edge extended continuously from the tip, along the edge of the blade, and along the edge of the hook.

8. The knife of claim 7, wherein the hook is concave and the belly is convex.

9. The knife of claim 7, wherein the at least one finger guard is positioned adjacent to the handle.

10. The knife of claim 9, wherein the at least one finger guard is positioned on the spine.

11. The knife of claim 9, wherein the at least one finger guard is positioned opposite the spine.

12. The knife of claim 9, wherein the at least one finger guard is extended across the entire border between the flat and the handle, from the spine to the hook.

13. The knife of claim 7, further comprised of serrations positioned on the spine.

14. The knife of claim 7, wherein two finger guards are concave and symmetrically positioned on opposite sides of the flat, adjacent to the handle.

15. The knife of claim 7, wherein each side of the cutting edge comprises two planar angles, forming a chiseled shape.

* * * * *